May 6, 1941.                C. W. BRYANT ET AL                    2,240,977
                                   VALVE
                         Filed Nov. 24, 1939              2 Sheets-Sheet 1
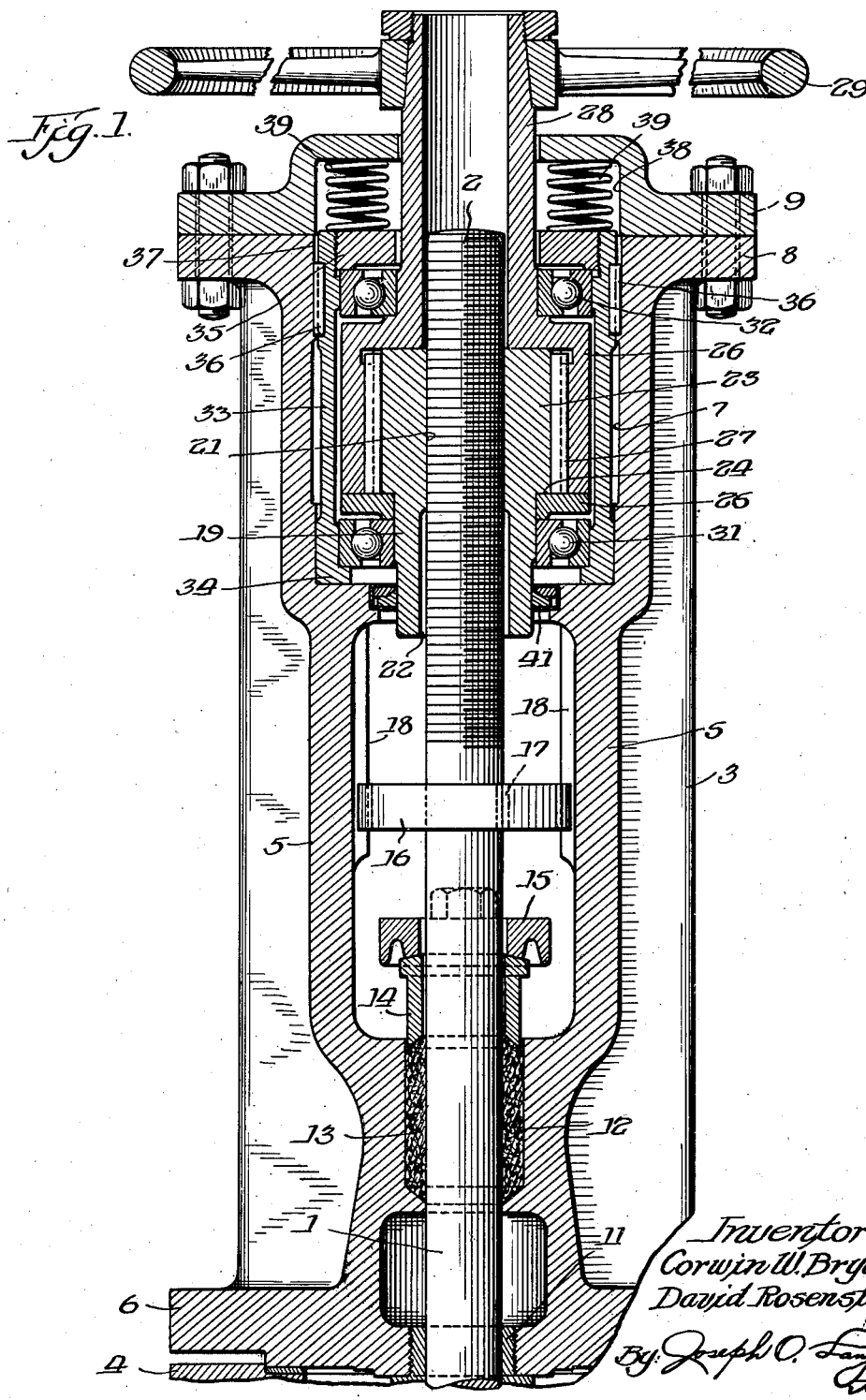
Inventors:
Corwin W. Bryant &
David Rosenston
By Joseph O. Lange

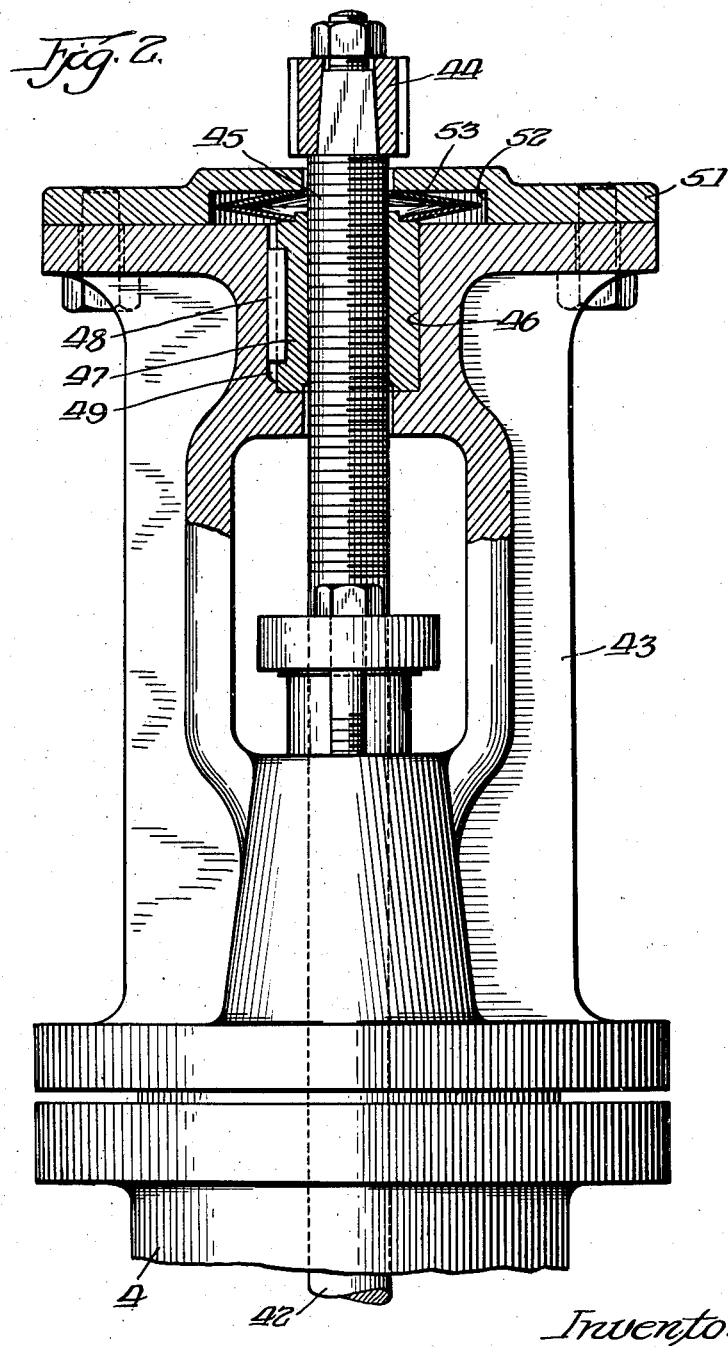

Patented May 6, 1941

2,240,977

UNITED STATES PATENT OFFICE 2,240,977

VALVE

Corwin W. Bryant, Downers Grove, and David Rosenston, Chicago, Ill., assignors to Crane Co., Chicago, Ill., a corporation of Illinois Application November 24, 1939, Serial No. 305,860

2 Claims. (Cl. 74—424.8)

This invention relates to valves and has particular reference to a novel construction for a valve yoke sleeve or bushing which is adaptable for assembly with valves having reciprocating closure members such as, for example, gate, globe and angle type valves.

In the art of outside screw and yoke, rising stem valves, previous constructions have frequently given unsatisfactory operating characteristics because either no provision at all was made for proper operation, or else an intricate and expensive device was provided, to compensate for the thermal expansion and contraction of the valve stem when the latter was in the fully open or closed position.

Our invention therefore contemplates the provision of a simple and relatively inexpensive non-rotating sliding yoke sleeve construction which may be embodied in a valve having either a rotating or non-rotating reciprocating stem and which permits expansion and contraction of the valve stem due to temperature changes of the said stem without adversely interfering with the operation of the valve.

The invention further contemplates the provision of a non-rotating sliding valve yoke sleeve which, if desired, may be utilized to actuate a controller mechanism, as hereinafter described, for a power operating unit provided for and mounted upon the valve structure.

Another object of our present invention lies in the provision of a valve stem thermal expansion and contraction compensating device which is preferably contained wholly within the valve yoke hub thereby materially reducing the number and size of the parts previously required in similar devices.

Other objects and advantages of our invention will be apparent from the following descriptions taken in connection with the accompanying drawings, in which Fig. 1 is a vertical sectional view of a valve yoke assembly embodying our invention and in which the valve stem is of the non-rotating type.

Fig. 2 is a partly sectional view of a valve yoke assembly embodying our invention as it may be applied to a rotating type valve stem.

Like reference numerals refer to like parts in the drawings.

Referring to Fig. 1, the valve stem 1 which in this form is of the non-rotating rising type is provided with a threaded end 2 projecting through the yoke member 3 of the valve 4. The construction of the valve itself to which our invention is applied is not of particular importance and, therefore, is not shown. It is readily apparent to those skilled in the art that present well known constructions of gate, globe, angle and the like valves are readily suitable for the adaptation of the invention.

The yoke 3 preferably comprises a pair of interconnected ribbed uprights 5 having their lowermost ends suitably formed with a flange 6 for attachment to the valve 4 and with the uppermost ends of the yoke suitably formed with a hub or recess 7, including the flange 8, the latter being for the attachment thereto of the cap 9 or, if desired, the base portion of a power operating unit may be attached thereto in place of the cap 9. The lower portion of the yoke is also provided with the usual stem hole bushing 11 and a stuffing box 12 which is supplied with the usual packing 13 compressed therein by the gland 14 and the gland flange 15.

As previously stated, the stem 1 shown in Fig. 1 is a non-rotating rising type. In order to prevent rotational movement of the stem, an oblong collar 16 is secured to the stem by the feather key 17 and is positioned on the stem immediately below the threaded portion 2. The ends of the collar 16 are bifurcated and straddle the guide ribs 18 provided on the innermost faces of the uprights 5.

The present invention lies particularly in the mechanism next to be described and which is contained within the hub or recess 7 in the upper portion of the yoke 3. A nut 19 is provided with an internal threaded portion 21 at one end engaging the threaded valve stem 2 and with a thread clearance bore 22 at the other end. The nut 19 is further provided with an enlarged head 23 defining a shoulder 24 which rests upon the ring 25. The nut 19 is preferably made of dissimilar material to the composition of the stem 1 thereby providing improved operating characteristics of the threaded engagement therebetween.

A nut socket 26, preferably made of hard or tough material similar to the stem 1, is provided with its lower portion surrounding and in close fitting splined engagement, as at 27, with the nut 19. The upper tubular portion 28 of the socket 26 extends upwardly through the cap 9 and provides suitable means for the attachment of a valve operator such as the handwheel 29.

Anti-friction ball thrust bearings 31 and 32 are provided to maintain respectively the assembled ring 25, the nut 19 and the socket 26 together as a unit within the substantially cylindrical hollow sleeve 33. The sleeve 33 has at its lower end an inwardly extending portion 34 forming a shoulder for the retention of the outer race of the ball bearing 31 and its upper end is internally screw-threaded for the attachment of the retaining disc 35 which secures the mechanism in assembled relation. A plurality of keys 36 are provided on the exterior cylindrical surface of the sleeve 33 near the upper end thereof which extend laterally into the splines or grooves 37 provided in the walls of the hub or recess 7, whereby rotational movement of the sleeve within the recess is prevented.

The cap 9 which is secured to the upper surface of the yoke hub provides a recess 38 above the non-rotating sleeve unit wherein a plurality of springs 39 are provided to resist and to limit the axial movement of the sleeve unit.

In order to prevent lubricant leakage out of the recess 7, a sealing means preferably, but not necessarily, comprising encased annular leathers 41 is provided in the valve stem opening in the bottom of the recess 7.

Attention is now directed to Fig. 2 in which a preferred simple embodiment is shown and wherein the valve stem 42 is of the rising and rotating type; the valve 4 and the yoke 43, if desired, may be of a construction similar to that of the valve and yoke shown and described in connection with Fig. 1. Obviously, of course, the collar 16 therein shown is omitted and suitable means such as the gear or splined hub 44 is provided upon the upper end 45 of the stem for cooperation with a driving means (not shown) which, as desired, may be either manual or power operated.

The simple modified construction of our invention, as shown in Fig. 2, comprises a hub or recess 46 in the upper portion of the yoke 43 and a slidable non-rotating yoke sleeve 47 in threaded engagement with the valve stem. Rotational movement of the sleeve 47 is prevented by the feather key 48 which projects into a groove 49 in the recess 46. A cap 51 secured to the upper surface of the yoke 43 provides a recess 52 surrounding the stem threaded portion 45 and immediately above the sleeve 47. A Belleville disc type spring 53 is provided within the recess 52 to yieldingly resist and to limit the axial sliding movement of the sleeve 47.

The manner in which our invention functions in the embodiment presently described is for the sleeve 33, or 47, depending upon the type of valve stem being operated, to slide axially upwardly within the yoke recess upon the final closing or seating movement of the valve closure member. The upward sliding movement of the sleeve is, of course, resisted and restricted by the springs placed above and exerting downwardly directed forces upon the sleeve.

Under numerous service conditions such as, for example, the pipeline transportation of heated oil, steam and the like, the various parts of a valve in the line may become relatively hot during the period the valve is in the open position. The valve stem, because of its partial contact directly with the fluid, may have a much higher temperature than other parts of the valve, for example, the yoke. Consequently, upon closing the valve and stopping flow therethrough, the valve parts cool and contract, and the valve stem, being initially at a higher temperature than the yoke, contracts more than the yoke. Thus the necessity for an expansion or contraction compensating means arises for the prevention of undue stresses being placed upon the stem or other parts of the valve, or for the prevention of leakage through the valve caused by the stem's contraction lifting the valve disc or closure member from its seat.

Thus it is apparent that our invention provides an efficient and compact thermal expansion and contraction compensating device because the yoke sleeve, which was forced upwardly during the final closing movement of the valve, may now slide downwardly in its hub or recess as the stem cools and contracts, rather than, if as normally provided, holding the stem fixedly so as to prevent the valve closure member from having a constant contact with its seat upon cooling of the line.

Also, in connection with the utilization of our invention, the upward sliding movement of the yoke sleeve may, if desired in the case of a power operated valve, be used to trip or actuate a controller switch for the purpose of shutting off the power supplied to the operating device.

While we have specifically illustrated and described the preferred embodiments of the invention, it may nevertheless be otherwise embodied and practiced within the scope of the following claims.

We claim:

1. In a valve, actuating means having a screw-threaded reciprocating operating stem, a yoke for the said stem, the said yoke having a cylindrically walled recess, a cap fixedly secured to the yoke substantially closing the upper portion of the recess, a sleeve in the said recess, the said sleeve comprising a hollow internally threaded member in threaded engagement with the said stem, the peripheral surface of the said sleeve fitting loosely in the said recess, locking means between the said sleeve and the said recess wall for the prevention of rotational movement of the said sleeve, resilient means above the said yoke cooperating with the said sleeve and bearing against a lower surface portion of the said cap, the said resilient means being accessible for inspection or the like immediately upon removal of the said cap, whereby the stem upon expansion due to a rise in temperature permits movement of the sleeve longitudinally within the recess.

2. In a valve, actuating means having a screw-threaded reciprocating operating stem, a yoke for the said stem, the said yoke having a cylindrically walled recess, a sleeve in the said recess, the said sleeve comprising a hollow internally threaded member in threaded engagement with the said stem, the peripheral surface of the said sleeve fitting in the said recess, means between the said sleeve and the said recess wall for the prevention of rotational movement of the said sleeve, apertured enclosure means defining the upper limit of movement of the said sleeve within the said recess, resilient means cooperating with the said sleeve and enclosure means to permit predetermined axial sliding movement of the said sleeve, the said stem having connecting means for operation, the said latter connecting means projecting through the aperture of the said enclosure means, the said resilient means annularly positioned around a portion of the stem connecting means.

CORWIN W. BRYANT.
DAVID ROSENSTON.